United States Patent
Gupta et al.

(10) Patent No.: US 11,055,647 B2
(45) Date of Patent: Jul. 6, 2021

(54) RESOURCE CONFLICT DETECTION AND COMMUNICATION

(71) Applicant: Microsoft Technology Licensing, LLC, Redmond, WA (US)

(72) Inventors: Ankit Gupta, Bellevue, WA (US); Anant Trivedi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 584 days.

(21) Appl. No.: 15/928,426

(22) Filed: Mar. 22, 2018

(65) Prior Publication Data
US 2019/0295020 A1    Sep. 26, 2019

(51) Int. Cl.
*G06Q 10/06*    (2012.01)
*G06Q 10/10*    (2012.01)
*H04L 12/58*    (2006.01)

(52) U.S. Cl.
CPC .. *G06Q 10/06314* (2013.01); *G06Q 10/06312* (2013.01); *G06Q 10/107* (2013.01); *G06Q 10/1095* (2013.01); *H04L 51/24* (2013.01)

(58) Field of Classification Search
None
See application file for complete search history.

(56) References Cited

U.S. PATENT DOCUMENTS

| | | | | |
|---|---|---|---|---|
| 4,937,743 A * | 6/1990 | Rassman | ............... | G06Q 10/06 705/7.22 |
| 6,324,517 B1 * | 11/2001 | Bingham | ............... | G06Q 10/02 705/7.24 |
| 6,614,450 B1 * | 9/2003 | Vossler | ................. | G06F 3/1423 715/751 |
| 7,027,995 B2 * | 4/2006 | Kaufman | ............ | G06Q 10/109 705/7.12 |
| 7,283,970 B2 * | 10/2007 | Cragun | ................ | G06Q 10/109 705/7.19 |
| 7,366,674 B2 * | 4/2008 | Dione | .................... | G06Q 30/02 705/323 |

(Continued)

FOREIGN PATENT DOCUMENTS

| | | | | | |
|---|---|---|---|---|---|
| WO | WO-2008085684 A1 * | 7/2008 | ............. | G06Q 10/10 |
| WO | WO-2011094054 A1 * | 8/2011 | ........... | G06Q 10/109 |
| WO | WO-2018111999 A1 * | 6/2018 | ............. | H04L 67/18 |

OTHER PUBLICATIONS

Quesnelle, Jeffrey, and Daniel Steffy. "Scheduling a conference to minimize attendee preference conflicts." Proceedings of the 7th multidisciplinary international conference on scheduling: theory and applications (MISTA). 2015. (Year: 2015).*

(Continued)

*Primary Examiner* — Matthew S Gart
*Assistant Examiner* — Derick J Holzmacher
(74) *Attorney, Agent, or Firm* — Christopher J. Volkmann; Kelly, Holt & Christenson, PLLC

(57) ABSTRACT

A meeting assignment conflict, between two meetings, a, is detected, because a meeting organizer is attempting to assign a given conference room to a second meeting, when it is already assigned to a first meeting. It is determined whether a number of participants in the first meeting is small enough to be accommodated by a different conference room. If so, the first meeting is automatically reassigned to the different conference room, and the second meeting is assigned to the given conference room.

20 Claims, 10 Drawing Sheets

(56) References Cited

U.S. PATENT DOCUMENTS

| | | | | |
|---|---|---|---|---|
| 7,440,747 B2* | 10/2008 | Takaki | | G06Q 10/109 |
| | | | | 455/412.2 |
| 7,777,632 B2* | 8/2010 | Elwell | | H05B 47/105 |
| | | | | 340/573.1 |
| 8,041,586 B2* | 10/2011 | Jethani | | G06Q 10/109 |
| | | | | 705/5 |
| 8,145,536 B1* | 3/2012 | Goel | | G06Q 10/025 |
| | | | | 705/26.1 |
| 8,180,657 B2* | 5/2012 | O'Sullivan | | G06Q 10/02 |
| | | | | 705/5 |
| 8,346,589 B1* | 1/2013 | Norton | | G06Q 10/1093 |
| | | | | 705/7.18 |
| 8,527,287 B1* | 9/2013 | Bhatia | | G06Q 10/109 |
| | | | | 705/1.1 |
| 8,626,550 B2* | 1/2014 | Marston | | G06Q 10/109 |
| | | | | 705/7.19 |
| 8,645,179 B2* | 2/2014 | Tewari | | G06Q 10/063112 |
| | | | | 705/7.16 |
| 8,669,844 B2* | 3/2014 | Walker | | G06Q 10/109 |
| | | | | 340/6.1 |
| 8,682,974 B2* | 3/2014 | Eriksson | | H04L 12/1831 |
| | | | | 709/204 |
| 8,743,198 B2* | 6/2014 | Padmanabh | | H04N 7/15 |
| | | | | 348/143 |
| 8,797,159 B2* | 8/2014 | Kirkpatrick | | G08B 13/189 |
| | | | | 340/541 |
| 8,799,048 B2* | 8/2014 | Bisht | | G06Q 10/02 |
| | | | | 705/7.19 |
| 9,256,845 B2* | 2/2016 | Toyama | | G06Q 30/0601 |
| 9,256,847 B2* | 2/2016 | Conzola | | G06Q 10/0631 |
| 9,307,037 B2* | 4/2016 | Sweeney | | H04W 4/029 |
| 9,491,576 B2* | 11/2016 | Weksler | | H04M 1/72457 |
| 9,710,793 B2* | 7/2017 | Hapse | | G06N 3/08 |
| 9,721,233 B2 | 8/2017 | Norton et al. | | |
| 9,727,846 B2 | 8/2017 | Hapse et al. | | |
| 9,760,870 B2 | 9/2017 | Norton et al. | | |
| 9,766,079 B1* | 9/2017 | Poel | | G01S 5/0242 |
| 9,852,388 B1* | 12/2017 | Swieter | | H04Q 9/00 |
| 9,860,707 B2* | 1/2018 | Jampani | | G06Q 10/1095 |
| 9,921,726 B1* | 3/2018 | Sculley | | A47C 7/00 |
| 9,955,318 B1* | 4/2018 | Scheper | | G06Q 10/063114 |
| 10,021,530 B2* | 7/2018 | Sigal | | H04W 4/33 |
| 10,181,139 B2* | 1/2019 | Glass | | G06Q 10/06398 |
| 10,289,966 B2* | 5/2019 | Daher | | G06K 9/00771 |
| 2001/0037229 A1* | 11/2001 | Jacobs | | G06Q 10/063112 |
| | | | | 705/7.14 |
| 2002/0069094 A1* | 6/2002 | Bingham | | G06Q 10/02 |
| | | | | 705/5 |
| 2002/0188489 A1* | 12/2002 | Cheng | | G06Q 10/06398 |
| | | | | 705/7.26 |
| 2002/0188490 A1* | 12/2002 | Kruse | | G06Q 10/109 |
| | | | | 705/5 |
| 2003/0103415 A1* | 6/2003 | Bates | | G06Q 10/109 |
| | | | | 368/28 |
| 2004/0054726 A1* | 3/2004 | Doss | | G06Q 10/109 |
| | | | | 709/205 |
| 2005/0058088 A1* | 3/2005 | Decker | | H04M 7/006 |
| | | | | 370/260 |
| 2005/0071213 A1* | 3/2005 | Kumhyr | | G06Q 10/0631 |
| | | | | 705/7.12 |
| 2005/0273372 A1* | 12/2005 | Bowne | | G06Q 10/10 |
| | | | | 705/5 |
| 2006/0015376 A1* | 1/2006 | Sattler | | G06Q 10/06 |
| | | | | 705/5 |
| 2006/0035205 A1* | 2/2006 | Dobson | | G07C 9/28 |
| | | | | 434/350 |
| 2006/0171337 A1* | 8/2006 | Shaffer | | H04L 12/1818 |
| | | | | 370/261 |
| 2006/0195892 A1* | 8/2006 | Inage | | G06Q 10/109 |
| | | | | 726/5 |
| 2006/0202834 A1* | 9/2006 | Moriwaki | | G01D 21/00 |
| | | | | 340/573.1 |
| 2006/0224671 A1* | 10/2006 | Miyata | | H04L 67/24 |
| | | | | 709/204 |
| 2007/0162315 A1* | 7/2007 | Hodges | | G06Q 10/0631 |
| | | | | 705/7.12 |
| 2007/0198708 A1* | 8/2007 | Moriwaki | | G06Q 10/06 |
| | | | | 709/224 |
| 2007/0226035 A1* | 9/2007 | Doss | | G06Q 40/00 |
| | | | | 705/7.19 |
| 2007/0288291 A1* | 12/2007 | Earle | | G06Q 10/109 |
| | | | | 705/7.13 |
| 2008/0079569 A1* | 4/2008 | Axelsen | | G06Q 10/10 |
| | | | | 340/541 |
| 2008/0109289 A1* | 5/2008 | Vivadelli | | G06Q 10/06 |
| | | | | 705/314 |
| 2008/0162198 A1* | 7/2008 | Jabbour | | G06Q 10/10 |
| | | | | 705/5 |
| 2008/0167937 A1* | 7/2008 | Coughlin | | G06Q 10/1095 |
| | | | | 705/7.16 |
| 2008/0244417 A1* | 10/2008 | Simpson | | G06Q 10/00 |
| | | | | 715/751 |
| 2008/0291021 A1* | 11/2008 | Bhogal | | G07C 9/28 |
| | | | | 340/572.1 |
| 2009/0006143 A1* | 1/2009 | Orttung | | G06F 40/56 |
| | | | | 705/5 |
| 2009/0112926 A1* | 4/2009 | Parker, II | | H04L 12/66 |
| 2009/0193217 A1* | 7/2009 | Korecki | | G06Q 10/087 |
| | | | | 711/170 |
| 2009/0204714 A1* | 8/2009 | Ferrara | | G06Q 10/10 |
| | | | | 709/228 |
| 2009/0237488 A1* | 9/2009 | Shudo | | G06Q 10/02 |
| | | | | 348/14.01 |
| 2009/0248704 A1* | 10/2009 | Greenwell | | G06Q 10/06 |
| 2009/0265280 A1* | 10/2009 | Taneja | | G06Q 50/188 |
| | | | | 705/80 |
| 2009/0287629 A1* | 11/2009 | Gabriel | | G06Q 10/02 |
| | | | | 706/47 |
| 2009/0327227 A1* | 12/2009 | Chakra | | H04L 12/1818 |
| 2010/0017245 A1* | 1/2010 | Kristiansen | | G06Q 10/02 |
| | | | | 705/5 |
| 2010/0070314 A1* | 3/2010 | Jethani | | G06Q 10/109 |
| | | | | 705/6 |
| 2010/0094467 A1* | 4/2010 | Kakiuchi | | F24F 11/30 |
| | | | | 700/276 |
| 2010/0198644 A1 | 8/2010 | Renfro et al. | | |
| 2010/0262926 A1* | 10/2010 | Gupta | | G06Q 10/109 |
| | | | | 715/764 |
| 2010/0274855 A1* | 10/2010 | Wassingbo | | G06Q 10/109 |
| | | | | 709/206 |
| 2011/0069141 A1* | 3/2011 | Mitchell | | H04N 7/15 |
| | | | | 348/14.09 |
| 2011/0184768 A1* | 7/2011 | Norton | | G06Q 10/109 |
| | | | | 705/5 |
| 2012/0038481 A1* | 2/2012 | Fujimoto | | G06Q 10/06 |
| | | | | 340/573.1 |
| 2012/0078676 A1* | 3/2012 | Adams | | G06Q 10/10 |
| | | | | 705/7.22 |
| 2012/0179981 A1* | 7/2012 | Whalin | | H04W 4/21 |
| | | | | 715/753 |
| 2012/0221368 A1* | 8/2012 | Sui | | G06N 3/126 |
| | | | | 705/7.17 |
| 2013/0038673 A1* | 2/2013 | Hiller | | H04L 12/1827 |
| | | | | 348/14.07 |
| 2013/0117059 A1* | 5/2013 | Norton | | G06Q 10/06314 |
| | | | | 705/7.18 |
| 2013/0204635 A1* | 8/2013 | Okumura | | G06Q 10/1095 |
| | | | | 705/2 |
| 2013/0254708 A1* | 9/2013 | Dorcey | | H04L 51/04 |
| | | | | 715/788 |
| 2014/0006080 A1* | 1/2014 | Yusa | | G06Q 10/1095 |
| | | | | 705/7.19 |
| 2014/0046716 A1 | 2/2014 | Black et al. | | |
| 2014/0164510 A1* | 6/2014 | Abuelsaad | | G06Q 10/109 |
| | | | | 709/204 |
| 2014/0229575 A1* | 8/2014 | Yamahara | | G06Q 10/06314 |
| | | | | 709/217 |

(56) References Cited

U.S. PATENT DOCUMENTS

| | | | | |
|---|---|---|---|---|
| 2014/0359718 | A1* | 12/2014 | Turunen | H04L 67/18 |
| | | | | 726/4 |
| 2015/0058425 | A1 | 2/2015 | Nathan et al. | |
| 2015/0193739 | A1* | 7/2015 | Min | G06Q 10/1095 |
| | | | | 705/7.19 |
| 2015/0213377 | A1* | 7/2015 | Ito | G06Q 10/10 |
| | | | | 705/5 |
| 2015/0302363 | A1* | 10/2015 | Wang | G06Q 10/1095 |
| | | | | 705/7.19 |
| 2015/0362909 | A1* | 12/2015 | McReynolds | G06Q 50/10 |
| | | | | 700/275 |
| 2016/0084664 | A1* | 3/2016 | Margalit | G01C 21/3438 |
| | | | | 701/410 |
| 2016/0180259 | A1 | 6/2016 | Marianko et al. | |
| 2016/0307167 | A1* | 10/2016 | Bathiya | H04L 51/046 |
| 2017/0316383 | A1* | 11/2017 | Naganathan | G06Q 10/1095 |
| 2018/0143025 | A1* | 5/2018 | Kurata | G08G 1/005 |

OTHER PUBLICATIONS

Nicholls, M. G. "A small-to-medium-sized conference scheduling heuristic incorporating presenter and limited attendee preferences." Journal of the Operational Research Society 58.3 (2007): 301-308. (Year: 2007).*

Tran, Linh Due, et al. "A smart meeting room scheduling and management system with utilization control and ad-hoc support based on real-time occupancy detection." 2016 IEEE Sixth International Conference on Communications and Electronics (ICCE). IEEE, 2016. (Year: 2016).*

"International Search Report and Written Opinion Issued in PCT Application No. PCT/US19/022162", dated May 21, 2019, 12 Pages.

* cited by examiner

RESOURCE CONFLICT DETECTION AND COMMUNICATION

BACKGROUND

Computing systems are currently in wide use. Some computing systems include electronic mail systems (e-mail systems) and calendar systems. These types of systems often include functionality for allowing a meeting organizer to generate a meeting request to schedule a meeting. Meeting requests often specify a list of desired attendees (invitees). Meeting requests are sent to the list of invitees through the electronic mail system, or through a separate messaging system.

Some meetings are also held in physical conference rooms. Thus, such systems often include conference room assignment logic that allows the meeting organizer to assign a conference room, where the meeting will be held.

Also, different conference rooms may be fitted with different resources, such as projectors which give the ability to project a presentation, seating capacity (or number of meeting attendees that can be accommodated), a public address system, the availability of special needs accommodations, or a wide variety of other resources. Therefore, the conference room assignment functionality often allows the meeting organizer to see which conference rooms have the different types of resources, so that a desired conference room, with desired resources, can be assigned to the meeting.

It may also happen that two or more different meeting organizers are attempting to organize meetings at the same time, using the same conference rooms. Also, one meeting organizer may have already assigned a particular conference room to his or her meeting, when a second meeting organizer attempts to schedule a meeting using the same conference room (because of its capacity, because of its resources, etc.).

The discussion above is merely provided for general background information and is not intended to be used as an aid in determining the scope of the claimed subject matter.

SUMMARY

A meeting assignment conflict, between two meetings, a, is detected, because a meeting organizer is attempting to assign a given conference room to a second meeting, when it is already assigned to a first meeting. It is determined whether a number of participants in the first meeting is small enough to be accommodated by a different conference room. If so, the first meeting is automatically reassigned to the different conference room, and the second meeting is assigned to the given conference room.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
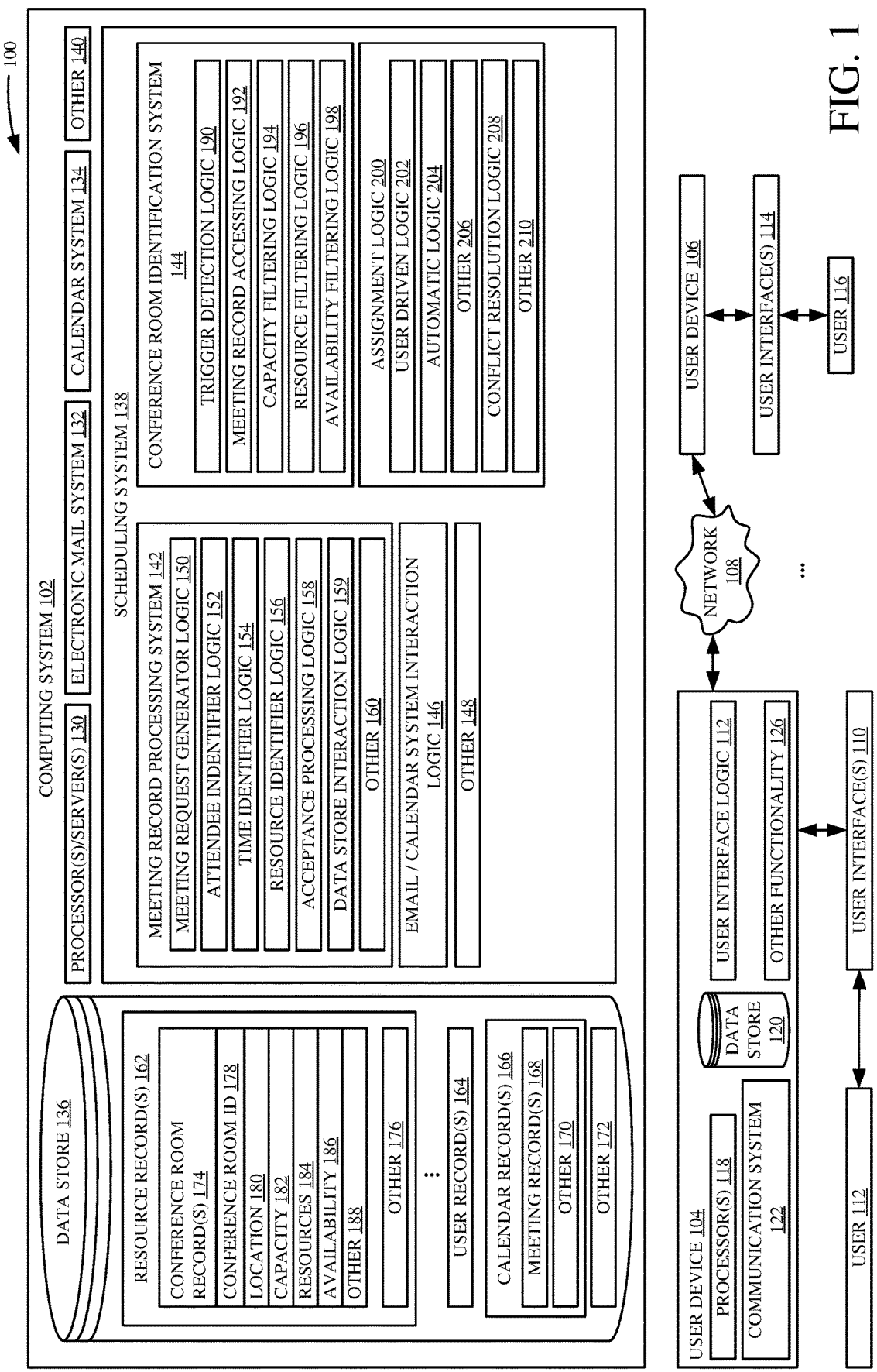
FIG. 1 is a block diagram of one example of a computing system architecture.

FIG. 1 is a block diagram of one example of a computing system architecture 100. Architecture 100 illustratively includes computing system 102 that can be accessed by a number of user devices 104-106, over network 108. Network 108 can be a wide area network, a local area network, a cellular communication network, a near field communication network, or any of a wide variety of other networks, or combinations of networks.

FIG. 1 also shows that, in one example, user device 104 generates user interfaces 110, for interaction by user 112. User 112 illustratively interacts with user interfaces 110 in order to control and manipulate user device 104, and portions of computing system 102. Similarly, FIG. 1 shows that user device 106 generates user interfaces 114 for interaction by user 116. User 116 illustratively interacts with user interfaces 114 in order to control and manipulate user device 106 and some portions of computing system 102.

The user devices 104 and 106 can be similar, or different. For purposes of the present description, it will be assumed that they are similar, so that only user device 104 will be described in more detail. In the example shown in FIG. 1, user device 104 illustratively includes one or more processors or servers 118, data store 120, communication system 122, user interface logic 124, and it can include a wide variety of other functionality 126. User interface logic 112 illustratively generates user interfaces 110 and detects user interaction with user interfaces 110. It can provide an indication of those interactions to other items on user device 104, or to computing system 102, through network 108. Communication system 122 illustratively allows user device 104 to communicate with computing system 102 over network 108. Therefore, it may include client-side functionality for computing system 102, or it may simply include a communication system that is configured for communication over network 108.

Computing system 102 illustratively includes processors or servers 130, electronic mail system 132, calendar system 134, data store 136, scheduling system 138, and it can include a variety of other functionality 140. Before describing architecture 100 in more detail, a brief overview of the operation of architecture 100, will first be provided.

In one example, user 112 illustratively interacts with scheduling system 138 to generate a meeting request in which user 112 specifies different invitees, who are to be invited to the meeting. User 112 may also illustratively assign a conference room for the meeting. Electronic mail system 132 then sends out an electronic mail message to the invitees, inviting them to the meeting. They can accept or decline the meeting by responding to the meeting request, or in other ways.

In assigning a conference room, scheduling system 138 illustratively recommends a conference room to user 112, based upon the number of invitees to the meeting, and based upon any other resources that user 112 has indicated that he or she will need in the conference room. For instance, if user 112 is scheduling a meeting with five attendees, it may be that scheduling system 138 will recommend a conference room that accommodates six people. However, in one example, user 112 can also assign a different conference room, other than the one suggested. For instance, it may be that user 112 selects a conference room that can accommodate 25 people, because it is closer to the location of user 112, even though its capacity is far greater than is needed for the meeting that user 112 is attempting to schedule.

At a later time, user 116 may attempt to schedule a meeting with 20 invitees. In that case, in accordance with one example, scheduling system 138 first determines whether there are any conference rooms available that can accommodate the meeting being scheduled by user 116. If so, it suggests those conference rooms to user 116 for assignment. However, if there are no conference rooms available with sufficient capacity, then scheduling system 138 automatically reschedules the meeting that was generated by user 112 to a smaller conference room, if one is available, and interacts with e-mail system 132 to notify all the attendees of the new location for the meeting. It then suggests the conference room that accommodates 25 people to user 116, so user 116 can assign that conference room to the meeting, if desired. All of these operations are described in greater detail below.

It will be noted that when users 112 or 116 are generating meeting requests, they may also be referred to as meeting organizers. Thus, users 112 and 116 can be meeting organizers, invitees and/or attendees.

Before the operations or architecture 100 are described in greater detail, a brief description of some of the items in computing system 102, and their operation, will first be provided. Electronic mail system 132 illustratively allows users to send and receive electronic mail messages, and to perform other electronic mail functions, such as to open messages, read them, respond to them, send and receive attachments, etc. It also interacts with scheduling system 138 to send meeting requests, to receive acceptances, declines, meeting cancellations, etc.

Calendar system 134 illustratively maintains the calendars of the various users 112-116 of computing system 102. It has functionality that allows those users to perform calendaring functions, such as to add appointments or tasks, and to schedule various activities. It can also provide functionality so that users can share their calendars with one another or make them available for viewing by one another, etc.

Scheduling system 138 illustratively includes meeting record processing system 142, conference room identification system 144, e-mail/calendar system interaction logic 146, and it can include other items 148. Meeting record processing system 142 illustratively includes functionality or logic that allows user to make and modify meeting requests, to respond to meeting requests, etc. Thus, system 142 illustratively includes meeting request generator logic 150, attendee identifier logic 152, time identifier logic 154, resource identifier logic 156, acceptance processing logic 158, data store interaction logic 159, and it can include other items 160. Meeting request generator logic 150 illustratively exposes functionality that allows a user, such as user 112, to generate a meeting request that can be sent, using electronic mail system 132, or another messaging system, to specified invitees or participants in the meeting. Attendee identifier logic 152 exposes functionality that allows user 112 to select or otherwise identify attendees to which the meeting request will be sent. Time identifier logic 154 allows user 112 to identify or specify a time when the meeting will be held. Resource identifier logic 156 illustratively exposes functionality that allows user 112 to specify or select other resources that will be needed for the meeting (such as a conference room, the ability to project a presentation, a public address system, etc.). Acceptance processing logic 158 illustratively exposes functionality that allows the attendees or participants that were invited to the meeting to accept or decline that invitation.

Data store 136 illustratively includes one or more resource records 162, various user records 164, and calendar records 166 (which may include meeting records 168 and other records 170). Data store 136 can include a wide variety of other things 172 as well. The meeting records, as is described in greater detail below with respect to FIG. 2, define the various parameters input by user 112 when the meeting request was generated. User records 164 illustratively maintain records corresponding to the various users of the system, such as their e-mail addresses, their profiles, etc.

Resource records 162 illustratively includes one or more conference room records 174 and it can include other resource records 176. The conference room records 174 illustratively identify various characteristics of the different conference rooms that are available for holding meetings. Each conference room record 174 can include a conference room identifier 178, a location 180 of the conference room, a conference room capacity 182, a set of resources 184 that are available in that conference room, an availability record 186 which indicates when meetings are already scheduled to be held in the conference room, and when the conference room is free, etc. Each conference room record 174 may include a wide variety of other items 188.

Conference identification system 144 illustratively identifies which of the various conference rooms that are available, based on the information in the meeting record 168 created for the meeting request, can be used for the meeting and it assigns an appropriate conference room to the meeting request. It may assign the conference room automatically or it may surface a set of available conference rooms, that meet the resources and capacity identified by user 112 in the meeting request, so that user 112 can select from among the available conference rooms.

Therefore, in one example, conference room identification system 144 illustratively includes trigger detection logic 190, meeting record accessing logic 192, capacity filtering logic 194, resource filtering logic 196, availability filtering logic 198, assignment logic 200 (which, itself, illustratively includes user-driven logic 202, automatic logic 204, and it can include other items 206), conflict resolution logic 208, and it can include a wide variety of other items 210. When conference room identification system 144 is invoked by scheduling system 138 to assign a conference room (or to suggest available conference rooms) for a meeting, meeting record accessing logic 192 accesses the meeting record 168 that was generated for the meeting. Capacity filtering logic 194 then filters the conference room records based upon the number of attendees, and the capacity characteristic 182 in the corresponding conference room records 174. Resource filtering logic 196 filters the conference room records based upon the resources identified in the meeting record 168 and the resources 184 available in the corresponding conference room. Availability filtering logic 198 filters the conference room records 174 based upon the time for the meeting specified in the meeting record 168 and the availability 186 of the various conference rooms.

Once a set of appropriate conference rooms (conference rooms that meet that various filtering criteria) are identified, assignment logic 200 exposes functionality to assign one of those conference rooms to the meeting. User driven logic 208 illustratively generates a set of user interfaces that allow a user to see the available conference rooms and to select one for assignment to the meeting. Automatic logic 204 automatically assigns one of the conference rooms to the meeting, and some examples of this are described in greater detail below.

Conflict resolution logic 208 determines when a user is attempting to schedule a meeting where there are no conference rooms available for that meeting. In some cases, as is discussed below, conflict resolution logic 208 will use automatic logic 204 to automatically reassign an existing meeting to a different conference room (such as where the existing meeting has a number of attendees that could fit in a smaller conference room and the conflicting meeting request has a number of attendees that could be accommodated by the conference room assigned to the existing meeting). Again, examples of this are described in greater detail below with respect to FIGS. 5 and 6.

Figure 2:
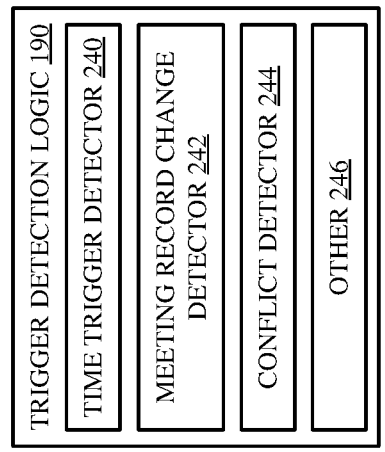
FIG. 2 is a block diagram of one example of a meeting record.

FIG. 2 is a block diagram showing one example of a meeting record 168. When request generator logic 150 first generates a meeting request record 168, based upon the inputs (such as from user 112) it assigns the meeting a meeting identifier 220. Also, it identifies the various invitees or participants 222 that are specified by user 112, when the meeting request is generated. Meeting record 168 is also updated by acceptance processing logic 158 when an invitee or participant accepts the meeting. Therefore, meeting record 168 identifies the accepted attendees 224. Meeting record 168 also illustratively includes a meeting time identifier 226 and an assigned conference room identifier 228 that identifies the particular conference room assigned to the meeting. It can include a title/subject portion 230 that identifies the title or subject of the meeting, and it can include a wide variety of other items 232.

Even after a conference room is assigned to a meeting, it may be that the conference room assignment is intermittently re-evaluated by conference room identification system 144, automatically. This re-evaluation can be triggered by a variety of different triggers. In one example, trigger detection logic 190 detects when a re-evaluation trigger occurs, and initiates a re-evaluation of the conference room assigned to a particular meeting, based upon that trigger.

Figure 3:
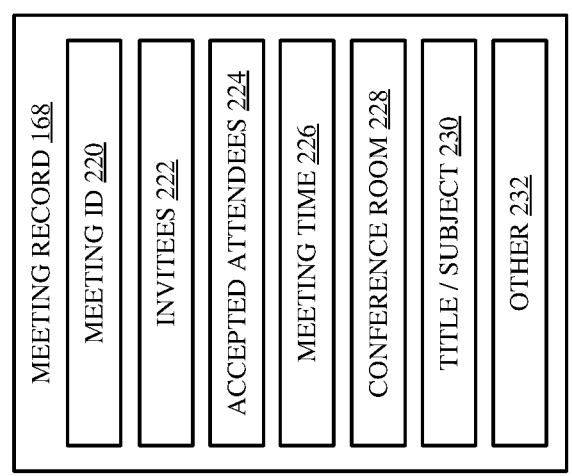
FIG. 3 is a block diagram showing one example of trigger detection logic.

FIG. 3 shows a block diagram illustratively one example of trigger detection logic 190, in more detail. FIG. 3 shows that, in one example, trigger detection logic 190 can include a time trigger detector 240, a meeting record change detector 242, a conflict detector 244, and it can include other items 246. Time trigger detector 240 can trigger a conference room re-evaluation process based upon a particular time. For instance, it may be that the meeting request is associated with a time deadline (or time cutoff) for accepting attendance at the meeting. This may be a threshold time before the meeting is to occur, such as one hour, 12 hours, 24 hours, etc. In that case, time trigger detector 240 detects a time trigger when that time threshold occurs and generates a trigger signal to control conference room identification system 144 to re-evaluate the conference room assignment that has been made to the corresponding meeting for which the time trigger has been detected. If, for instance, the number of people who have actually accepted the meeting request, as of the time cut-off, indicates that the number of attendees will fit into a smaller conference room, then the conference room assignment can be re-evaluated and the meeting can be reassigned to the smaller conference, as discussed in more detail below.

Meeting record change detector 242 detects various changes to the meeting record 168 that may trigger a conference room assignment process. For instance, when a given number of invitees have accepted the meeting request, this will cause changes to the meeting record 168 to indicate those acceptances. This type of change can trigger a conference room re-evaluation. As an example, if a relatively small conference room is originally assigned to a meeting, because the meeting organizer does not expect all of the invitees to attend, but more invitees accept the meeting request than can fit into the assigned conference room, then the organizer may be notified and the meeting may be reassigned to a larger conference room. The same is true if a number of "decline" messages are received indicating that the number of attendees that will attend the meeting is small enough to fit into a smaller conference room. The organizer may be notified and the meeting may be assigned to a smaller conference room in that case as well.

Conflict detector 244 illustratively detects when a meeting request is being generated for a conflicting meeting. An example of a conflicting meeting is a meeting that has a number of participants that can be accommodated by a conference room that is already assigned to a different meeting, at the same time. That is, if the first meeting is assigned to a conference room that could accommodate the second meeting request, then a conflict arises. In that case, conflict detector 244 may initiate a conference room re-evaluation process.

Figure 4A:
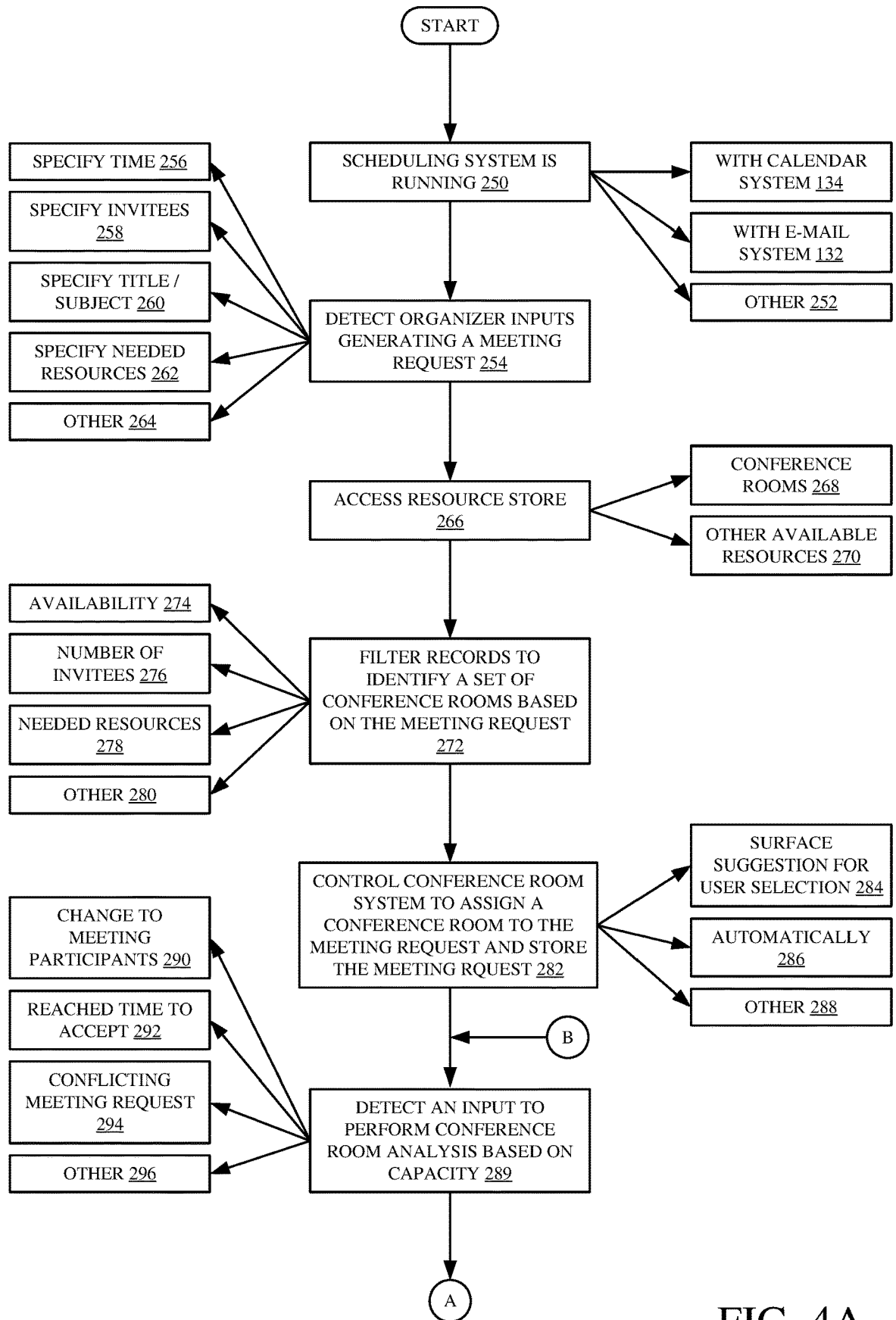
FIGS. 4A and 4B (collectively referred to herein as FIG. 4) are a flow diagram showing one example of the operation of the architecture illustrated in FIG. 1 in assigning a conference room to a meeting and re-evaluating whether the meeting should be assigned to a different conference room, based upon a conference room assignment trigger being detected.
Figure 4B:
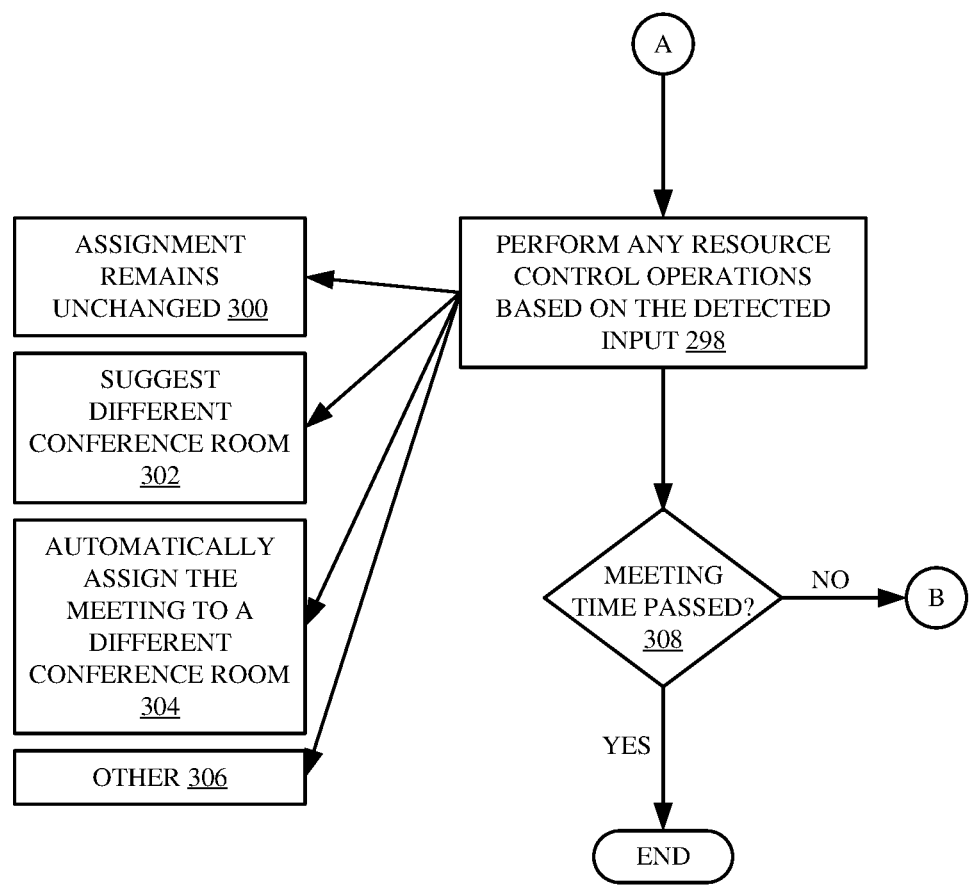

FIGS. 4A and 4B (collectively referred to herein as FIG. 4) show a flow diagram illustrating one example of the overall operation of architecture 100 in allowing a meeting organizer to generate a meeting request and have a conference room assigned to the corresponding meeting. FIG. 4 also illustrates the operation of architecture 100 in performing some different conference room assignment re-evaluation steps. Thus, in the example shown in FIG. 4, it is assumed that scheduling system 138 is running. This is indicated by block 250 in the flow diagram of FIG. 4. It may be running along with a calendar system 134, an e-mail system 132, and it may be running along with a wide variety of other systems 252.

At some point, scheduling system 138 detects an organizer input indicating that an organizer wishes to generate a meeting request. This is indicated by block 254. In the example described herein, it will be assumed that user 112 is the meeting organizer and user 112 wishes to generate a meeting request for a meeting.

Meeting record processing system 142 illustratively detects organizer inputs generating a meeting request using various items of logic. For instance, time identifier logic 154 can detect an organizer input specifying a time, or a proposed time, for the meeting. This is indicated by block 256. Attendee identifier logic 152 can detect an organizer input specifying invitees, who will receive the meeting request. This is indicated by block 258. Meeting request generator logic 150 can also detect an organizer input specifying a title or a subject of the meeting that may be included in the meeting request. This can also include additional descriptive material that may be accessed by invitees as well. This is indicated by block 260. Resource identifier logic 156 illustratively detects organizer inputs specifying needed resources, such as the ability to project a presentation, such as a public address system, etc. This is indicated by block 262. Meeting record processing system 142 can also detect a wide variety of other organizer inputs in generating a meeting request. This is indicated by block 264.

Meeting record accessing logic 192 in conference room identification system 144 then accesses the resource records 162 in data store 136. This is indicated by block 266. It illustratively accesses the resource records 162 that identify conference rooms, such as conference room records 174. This is indicated by block 268. It may also illustratively access different data in data store 136 that identifies other available resources as well. This is indicated by block 270.

Conference room identification system 144 then filters the conference room records 174 to identify a set of conference rooms, based upon filter criteria identified in the meeting request. This is indicated by block 272. For instance, availability filtering logic 198 illustratively filters the conference room records 174 based upon the availability 286 identified for each conference room, and based upon the specified time 256 that the organizer is attempting to arrange the meeting. Filtering the conference room records based upon availability is indicated by block 274.

Capacity filtering logic 194 then identifies the number of invitees in the meeting request and filters the conference room records 174 based upon the capacity criteria 182, corresponding to each conference room. It identifies those conference rooms that are available at the desired time, that have a sufficient capacity that they can handle the meeting corresponding to the meeting request. Filtering the conference room records based upon the number of invitees is indicated by block 276 in the flow diagram of FIG. 4.

Resource filtering logic 196 then filters the conference room records 174 based upon any specified or needed resources 262 that were identified by the meeting organizer when generating the meeting request. Filtering the conference room records based upon these types of resources is indicated by block 278 in the flow diagram of FIG. 4. Conference room identification system 144 can filter the conference room records based upon a wide variety of other filter criteria as well, and this is indicated by block 280.

Once a set of conference rooms are identified, based upon the filter criteria, then assignment logic 200 controls scheduling system 138 to assign a conference room to the meeting request that was generated by the meeting organizer. This is indicated by block 282 in the flow diagram of FIG. 4. This can be done using user driven logic 202 or automatic logic 204, or in other ways. For instance, in one example, user driven logic 202 generates a user interface display that can be surfaced for the meeting organizer, and that identifies conference rooms that meet the filter criteria, and that may be suggested by conference room identification system 144. For instance, it may surface a user interface display that displays and indicator for each conference room that meets the filter criteria, arranged in order of rooms that have a capacity closest to, but still meeting, the capacity needed to accommodate the meeting. They can then be arranged in order of their location to the attendees, or in other ways. In one example, the user interface display that surfaces the indications of the various conference rooms can include a selector or another user actuatable interface mechanism that allows the meeting organizer to assign one of the suggested conference rooms to the meeting. Surfacing a suggestion for user selection is indicated by block 284.

In another example, automatic logic 284 automatically selects a conference room for the meeting request and assigns it to the meeting request and then notifies the organizer of the assigned conference room. It may allow the organizer to change the conference room, in some examples. Automatically assigning a conference room to the meeting request is indicated by block 286. The conference room can be assigned in other ways as well, and this is indicated by block 288. E-mail/calendar system interaction logic 146 then illustratively interacts with e-mail system 132 to control system 132 to send the meeting request to the invitees identified by the meeting organizer.

At some point, after the meeting request is sent, trigger detection logic 190 detects a trigger indicating that conference room assignment processing or analysis should be performed, based upon the detected trigger. In one example, the triggers detected by trigger detection logic 190 are related to the capacity of the conference room. This is indicated by block 289. For instance, meeting record change detector 242 (shown in FIG. 3) illustratively detects a change to the meeting request record that affects the number of participants in the meeting. By way of example, it may be that the organizer has added additional attendees or invitees to the meeting request record. The organizer or another person may have deleted some invitees or participants. In these examples, it may be that the capacity of the conference room that is assigned to the meeting is either too small (e.g., to handle additional attendees), or is too large (because some of the participants have been deleted or declined to come to the meeting, etc.). In that case, conference room identification system 144 performs another analysis to identify whether another, better or more appropriate conference room should be assigned to the meeting, based on conference room capacity. Detecting a change to the meeting record that affects the number of meeting participants is indicated by block 290.

In another example, a time cut-off before the meeting is predefined, or set by the meeting organizer. This time cut-off will correspond to a cut-off time by which invitees can accept the meeting request or decline it. In that scenario, time trigger detector 240 (shown in FIG. 3) detects when the time cut-off has been reached. This again triggers conference room identification system 144 to analyze the conference room that is assigned to the meeting, based upon the number of invitees who have accepted the meeting request as of the time cut-off, to determine whether a different conference room should be assigned. For instance, assuming there were 25 invitees in the meeting request, but only 8 of them have accepted the meeting by the cut-off. In that case, it may be that the conference room that was previously assigned is much too large, and should be freed for other larger meetings that various users may be attempting to schedule. Detecting that the time cut-off has been reached is indicated by block 292.

It may also be that conflict detector 244 (again shown in FIG. 3) detects that another organizer is attempting to schedule a conflicting meeting. For instance, assume that there is only one conference room that can handle 25 meeting participants. Assume also that the original meeting organizer 112 has assigned that conference room to his or her meeting when generating the meeting request. Assume further that another meeting organizer (e.g., user 116) is now attempting to schedule another meeting, for the same time, where that meeting has 25 attendees. In that case, conflict detector 244 will detect this as a conference room conflict, and trigger conference room identification system 144 to analyze the assignment of that conference room to the first meeting, to see whether it is still appropriate. By way of example, it may be that the meeting organizer 112 only had 8 invitees on the meeting request and ignored the suggestion by system 144 to schedule a smaller conference room. In that case, it may be appropriate to reassign that meeting to a smaller conference room so that the larger meeting can be accommodated. Detecting a conflicting meeting request is indicated by block 294. Analysis of the original conference room assignment can be triggered in other ways as well, and this is indicated by block 296.

Based upon trigger detector signals generated for the trigger detected by trigger detection logic 190, conference room identification system 144 performs any resource control operations, given the detected trigger. This is indicated by block 298 in the flow diagram of FIG. 4. For instance, it may be that the conference room assignment remains unchanged, despite the detected trigger. This is indicated by block 300. Assume, for example that the time cut-off for responding to the meeting request has passed. Further assume that all of the invitees have accepted. In that case, the originally assigned conference room is very likely the one that would be assigned after the analysis is performed. Thus, the conference room assignment remains unchanged.

It may also be that a different conference room, which may be better suited to the meeting, based upon the capacity, has been identified. In that case, user driven logic 202 illustratively surfaces a suggestion, suggesting that the organizer change the conference room assignment to the newly identified conference room. This is indicated by block 302.

In another example, automatic logic 204 automatically assigns the meeting to a different conference room, based upon the analysis. This is indicated by block 304. By way of example, where meeting organizer 112 ignored an earlier suggestion to schedule a smaller conference room, and now a conflicting meeting request has been generated and the conflict detected, then automatic logic 204 may illustratively automatically reassign the first meeting to a smaller conference room (perhaps the one that was originally suggested) thus freeing up the larger conference room that was manually assigned by the meeting organizer 112, so that it can be used to accommodate the conflicting meeting request.

The resource control operations can be performed in a wide variety of other ways as well. This is indicated by block 306.

In one example, the processing continues until the meeting time has passed. Therefore, conference room identification system 144 continues to use trigger detection logic 190 to detect any triggers that may trigger reassignment of a conference room, or reanalysis of the conference room assignment. Continuing this process until the meeting time has passed is indicated by block 308 in the flow diagram of FIG. 4.

Figure 5:
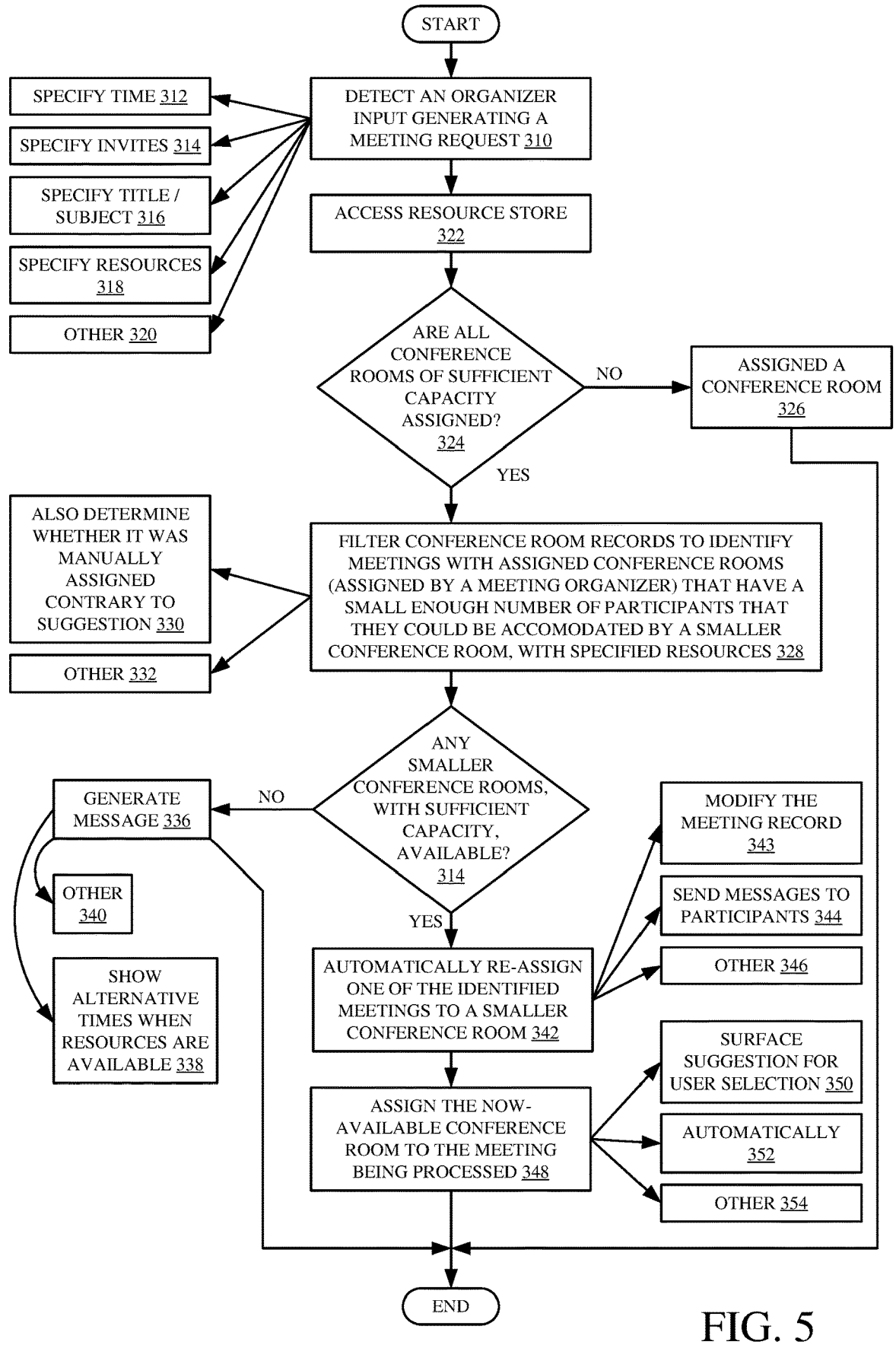
FIG. 5 is a flow diagram illustrating one example of the architecture shown in FIG. 1 in automatically reassigning a meeting to a conference room that accommodates fewer participants, when a conflicting meeting is detected.

FIG. 5 is a flow diagram illustrating one example of the operation of conflict resolution logic 208 in performing conflict resolution, when a conflicting meeting request is detected. Therefore, in one example, meeting record processing system 142 first detects an organizer input or a set of organizer inputs generating a meeting request. This can be similar to that described above with respect to blocks 254-264 in the flow diagram of FIG. 4. Detecting the organizer input is indicated by block 310. Detecting an input specifying a meeting time is indicated by block 312. Detecting an input specifying invitees is indicated by block 314. Detecting an input specifying a title or subject is indicated by block 316. Detecting an input specifying various needed resources is indicated by block 318. Detecting a wide variety of other inputs is indicated by block 320.

Meeting record accessing logic 192 then accesses the conference room records 174 in data store 136. This is indicated by block 322. Conference room identification system 144 then uses filtering logic 194, 196 and 198 to determine whether there are any conference rooms available, which have sufficient capacity to handle the meeting corresponding to the meeting request, or whether they are all assigned. This is indicated by block 324. If there is a conference room available, that has sufficient capacity, then assignment logic 200 assigns a conference room to the meeting. This is indicated by block 326. Again, it can use user driven logic 202 to suggest selectable conference rooms to the meeting organizer, or it can use automatic logic 204 to automatically assign a conference room, or the assignment can be made in other ways.

If, at block 324, it is determined that there are not conference rooms available, that have sufficient capacity to meet the needs of the meeting corresponding to the meeting request, then a conflict is detected by conflict detector 244. Conflict resolution logic 208 then identifies meetings with assigned conference rooms (based upon the conference room records 174) that have a small enough number of participants that they could be accommodated by a smaller conference room. This is indicated by block 328. By way of example, and as mentioned above, it may be that the meeting organizer 112 ignored a recommendation to use a smaller conference room and instead assigned a larger conference room (larger than necessary) to his or her meeting. It may also be that there is a smaller conference room still available, that could accommodate his or her meeting. In that case, that meeting is identified as one that could be accommodated by a smaller conference room.

In another example, conflict resolution logic 208 also determines whether the conference room was initially, manually assigned, contrary to a suggestion suggesting a smaller conference room. This is indicated by block 330.

The meetings that could be accommodated by a smaller conference room can be identified in other ways as well. This is indicated by block 332.

Availability filtering logic 198 then determines whether any of those identified smaller conference rooms are available during the time that the original meeting was scheduled. This is indicated by block 334. If not, then that means no smaller conference rooms are available to be assigned to the original meeting request. Thus, the larger meeting still cannot be accommodated. Conflict resolution logic 208 then generates a message that can be sent indicating this. This is indicated by block 336. The message can be sent to both the organizer 112 of the original meeting request, and the organizer 116 of the conflicting meeting request. It may indicate that the meeting being organized by organizer 116 is larger than the one organized by organizer 112. It may also give organizer 112 the opportunity to voluntarily choose a different time, so that the larger meeting can be accommodated. The message may also simply indicate that the larger meeting cannot be accommodated at the time specified by organizer 116. The message can identify alternative times when the larger conference room is available. This is indicated by block 338. The message can take a wide variety of other forms as well, and this is indicated by block 340.

If, at block 334, it is determined that there is a smaller conference room available that can accommodate the meeting organized by organizer 112, then automatic logic 204 can automatically reassign that meeting to a smaller conference room. This is indicated by block 342 in the flow diagram of FIG. 5. It can do it by controlling data store interaction logic 159 to interact with data store 136 to modify the meeting record to show the smaller conference room assignment. This is indicated by block 343. It can also use e-mail system interaction logic 146 to control email system 132 to send messages to the participants in that meeting indicating that the conference room has been changed. This is indicated by block 344. The reassignment can be done in other ways as well, and this is indicated by block 346.

Once the original meeting has been reassigned to a smaller conference room, then the larger, now-available, conference room can be assigned to the meeting that is currently being processed (e.g., the larger meeting being organized by organizer 116). This is indicated by block 348. Assignment logic 200 can do this in a variety of different ways. For instance, user driven logic 202 can surface a suggestion, suggesting the conference room to meeting organizer 116 so that it can be selected and assigned in that way. This is indicated by block 350. Automatic logic 204 can automatically assign the meeting to the now-available conference room, and a message can be sent to organizer 116 identifying the assigned conference room. Automatically assigning the conference room is indicated by block 352. The conference room assignment can be made in other ways as well, and this is indicated by block 354.

The present description thus greatly enhances the operation and accuracy of the computing system. It controls the system to automatically generate accurate records identifying conference room or other resource assignment, based upon capacity. It automatically detects a reassignment trigger when there is a meeting conflict, and when one of the organizers ignored a suggestion to book a smaller conference room. The system identifies these scenarios and automatically reassigns the conference rooms to accommodate a great number of additional meetings, that would not otherwise be accommodated. This fundamental change in the operation of the computing system thus greatly enhances its efficiency. It also eliminates the need for multiple round trips to the data store, based upon user inputs, when reassignment is needed. This saves bandwidth and computing resources.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
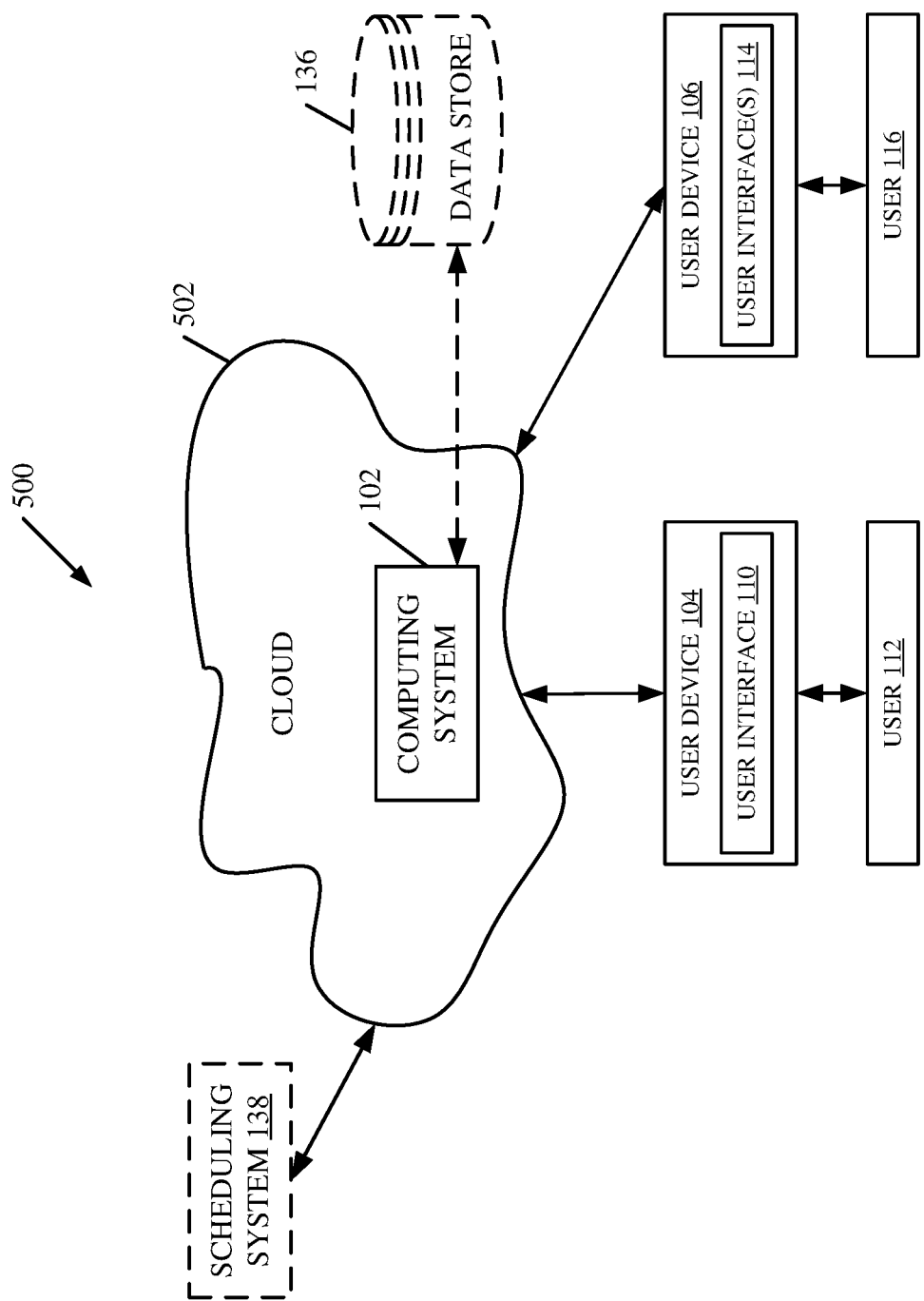
FIG. 6 is a block diagram showing one example of the architecture shown in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that computing system 102 can be located in cloud 502 (which can be public, private, or a combination where portions are public while others are private). Therefore, users 112, 116 use user devices 104, 106 to access those systems through cloud 502.

FIG. 6 also depicts another embodiment of a cloud architecture. FIG. 6 shows that it is also contemplated that some elements of computing system 102 can be disposed in cloud 502 while others are not. By way of example, data store 136 can be disposed outside of cloud 502, and accessed through cloud 502. In another example, scheduling system 138 (or other items) can be outside of cloud 502. Regardless of where they are located, they can be accessed directly by devices 104, 106, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
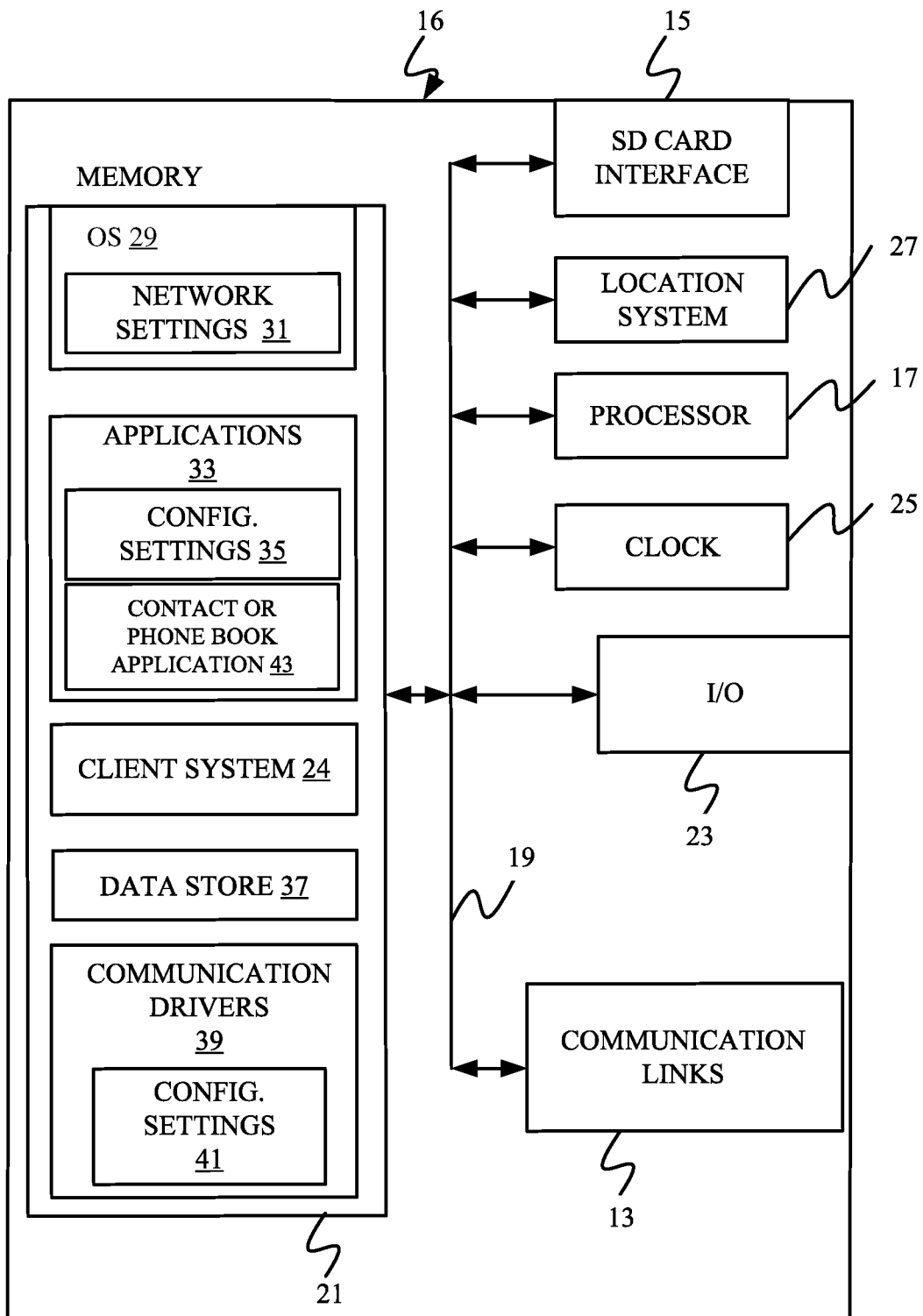
FIGS. 7-9 show examples of mobile devices that can be used in the architectures shown in the previous figures.
Figure 8:
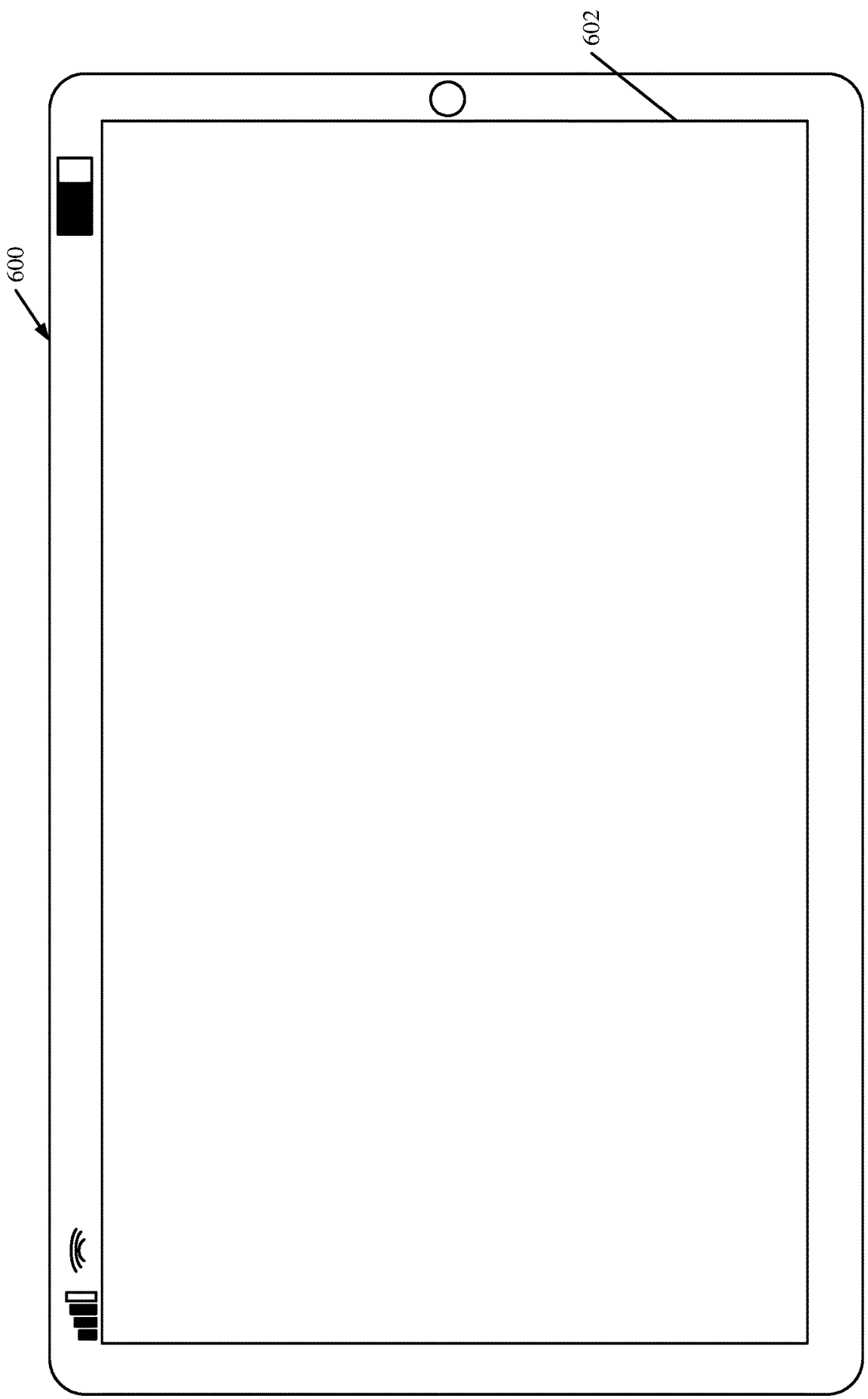
Figure 9:
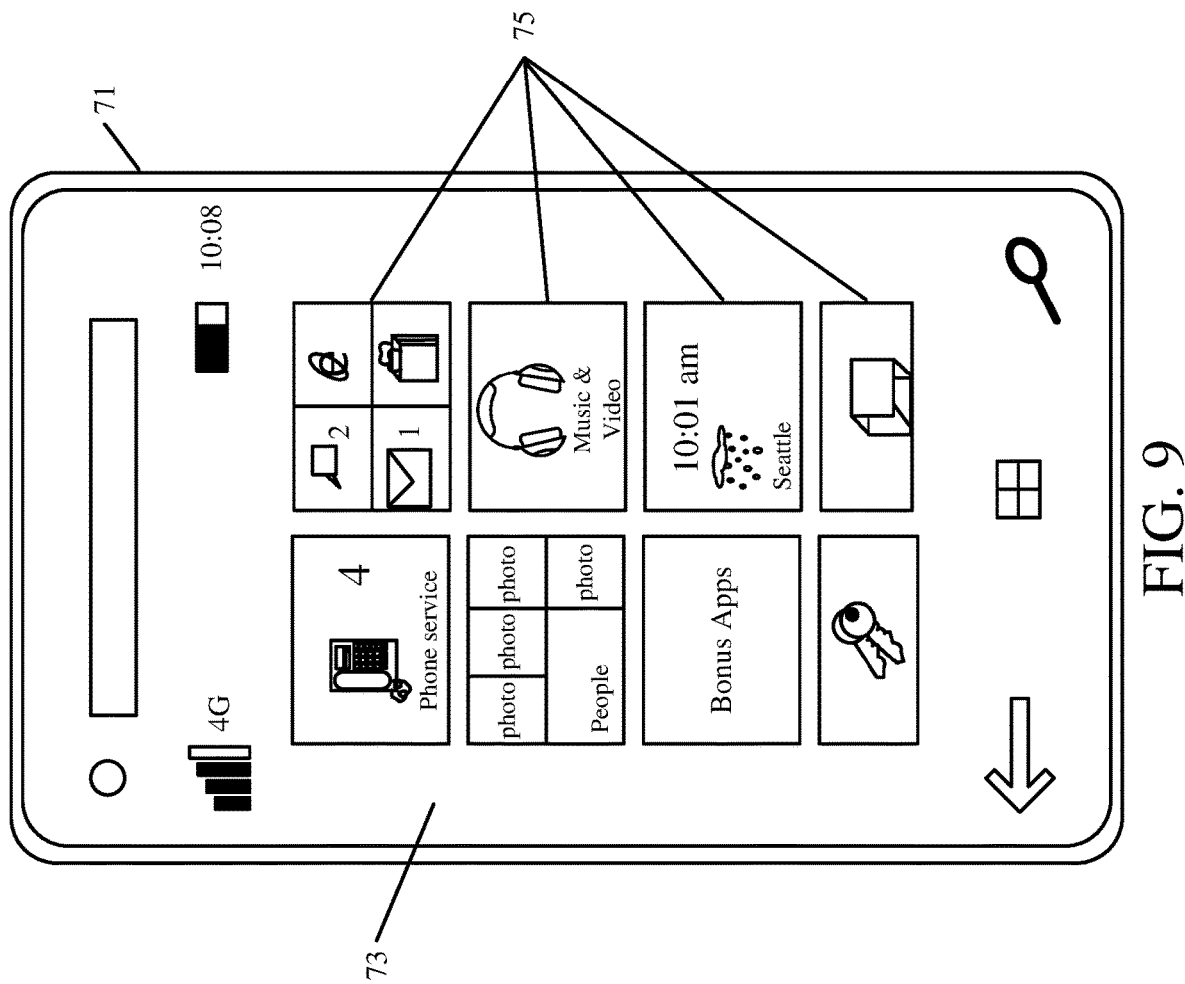

FIG. 7 is a simplified block diagram of one illustrative example of a handheld or mobile computing device that can be used as a user's or client's hand held device 16, in which the present system (or parts of it) can be deployed. FIGS. 8-9 are examples of handheld or mobile devices.

FIG. 7 provides a general block diagram of the components of a client device 16 that can run components computing system 102 or user device 104 or 106 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
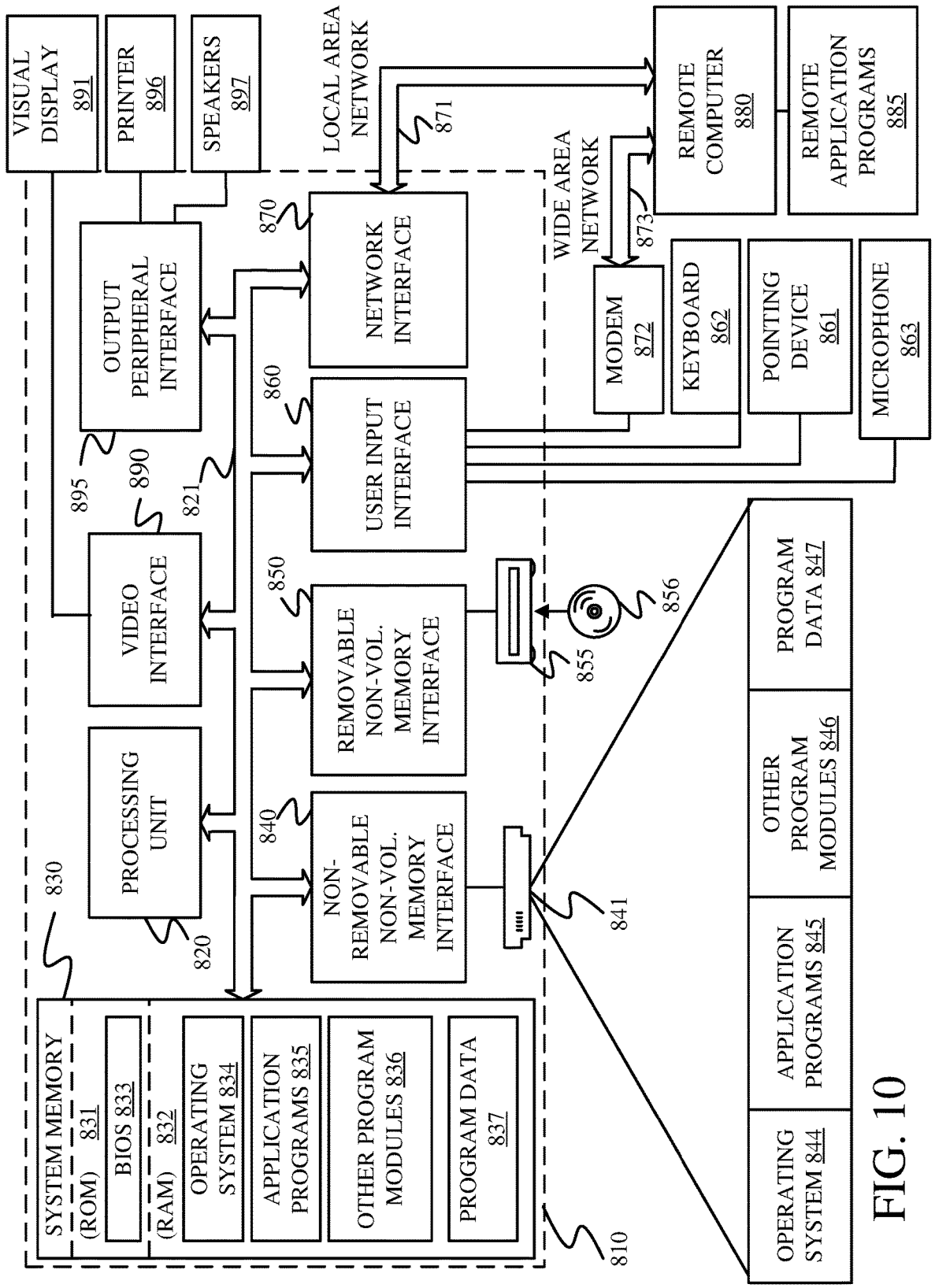
FIG. 10 is a block diagram showing one example of a computing environment that can be used in the architectures shown in the previous figures.

FIG. 10 is one example of a computing environment in which architecture 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a meeting record processing system that generates a meeting record corresponding to a first meeting that has a first number of participants and is assigned to a first conference room having a capacity that is larger than the first number of participants;

data store interaction logic that interacts with a data store to store the meeting record in the data store;

meeting request generator logic that receives a meeting request input identifying a meeting request for a second meeting having a second number of participants, that is larger than the first number of participants for the first meeting, and that is within the capacity of the first conference room;

capacity filtering logic that filters a set of conference room records based on the first number of participants to identify a second conference room having sufficient capacity to accommodate the first meeting; and assignment logic that controls the data store interaction logic to modify the meeting record for the first meeting by assigning the second conference room to the first meeting and that assigns the first conference room to the second meeting.

Example 2 is the computing system of any or all previous examples wherein the assignment logic comprises:

automatic logic configured to automatically assign the second conference room to the first meeting and the first conference room to the second meeting.

Example 3 is the computing system of any or all previous examples wherein the assignment logic comprises:

user driven logic configured to generate an indication of a user assignment interface with a suggested assignment portion suggesting assignment of the first conference room to the second meeting and an assignment user input mechanism.

Example 4 is the computing system of any or all previous examples wherein the user driven logic is configured to detect user actuation of the assignment user input mechanism, and wherein the assignment logic further comprises:

automatic logic configured to, in response to user actuation of the assignment user input mechanism, automatically assign the first conference room to the second meeting and the second conference room to the first meeting.

Example 5 is the computing system of any or all previous examples and further comprising:

electronic mail (email) system interaction logic configured to control an email system to send a re-assignment message to participants in the first meeting indicating that the first meeting is now assigned to the second conference room.

Example 6 is the computing system of any or all previous examples wherein the first meeting has a corresponding meeting time and an acceptance cutoff time indicative of a time offset before the meeting time, and further comprising:

trigger detection logic configured to detect occurrence of the acceptance cutoff time and generate a trigger signal, wherein the meeting record accessing logic is configured to, in response to the trigger signal, access the meeting record corresponding to the first meeting to identify a number of participants that have indicated a meeting acceptance and determine whether the number of participants that have indicated a meeting acceptance is smaller than the number of participants.

Example 7 is the computing system of any or all previous examples wherein the capacity filtering logic is configured to, when the number of participants that have indicated a meeting acceptance is smaller than the number of participants, filter the set of conference room records based on the number of participants that have indicated a meeting acceptance to identify whether a different conference room having sufficient capacity to accommodate the number of participants that have indicated a meeting acceptance is available.

Example 8 is the computing system of any or all previous examples wherein the assignment logic is configured to automatically assign the first meeting to the different conference room if the different conference is available.

Example 9 is a computer implemented method, comprising:

generating a meeting record, based on organizer inputs to meeting record generator logic, corresponding to a first meeting that has a first number of participants and is assigned, by a meeting organizer, to a first conference room having a capacity that is larger than the first number of participants;

controlling data store interaction logic to store the meeting record in a data store;

receiving a meeting request input identifying a meeting request for a second meeting having a second number of participants, that is larger than the first number of participants for the first meeting, and that is within the capacity of the first conference room;

filtering, in response to receiving the meeting request input and in response to determining that the first meeting was assigned to the first conference room by the meeting organizer, a set of conference room records based on the first number of participants to identify a second conference room having sufficient capacity to accommodate the first number of participants for the first meeting; and controlling the data store interaction logic to modify the meeting record for the first meeting by assigning the second conference room to the first meeting; and assigning the first conference room to the second meeting.

Example 10 is the computer implemented method of any or all previous examples wherein assigning the second conference room comprises:

automatically assigning the second conference room to the first meeting and wherein assigning the first conference room comprises automatically assigning the first conference room to the second meeting.

Example 11 is the computer implemented method of any or all previous examples wherein assigning the first conference room to the second meeting comprises:

generating an indication of a user assignment interface with a suggested assignment portion suggesting assignment of the first conference room to the second meeting and an assignment user input mechanism.

Example 12 is the computer implemented method of any or all previous examples wherein assigning the first conference room further comprises:

detecting user actuation of the assignment user input mechanism; and in response to user actuation of the assignment user input mechanism, automatically assign the first conference room to the second meeting and the second conference room to the first meeting.

Example 13 is the computer implemented method of any or all previous examples and further comprising:

controlling an electronic mail (email) system to send a re-assignment message to participants in the first meeting indicating that the first meeting is now assigned to the second conference room.

Example 14 is the computer implemented method of any or all previous examples wherein the first meeting has a corresponding meeting time and an acceptance cutoff time indicative of a time offset before the meeting time, and further comprising:

detecting occurrence of the acceptance cutoff time;

generating a trigger signal in response to detecting the occurrence of the acceptance cutoff time.

Example 15 is the computer implemented method of any or all previous examples and further comprising:

in response to the trigger signal, accessing the meeting record corresponding to the first meeting to identify a number of participants that have indicated a meeting acceptance;

and determining whether the number of participants that have indicated a meeting acceptance is smaller than the first number of participants.

Example 16 is the computer implemented method of any or all previous examples and further comprising:

when the number of participants that have indicated a meeting acceptance is smaller than the first number of participants, filtering the set of conference room records based on the number of participants that have indicated a meeting acceptance to identify whether a different conference room having sufficient capacity to accommodate the number of participants that have indicated a meeting acceptance is available.

Example 17 is the computer implemented method of any or all previous examples and further comprising:

if the different conference room is available, automatically assigning the first meeting to the different conference room.

Example 18 is a computing system, comprising:

a meeting record processing system that generates a meeting record corresponding to a first meeting that has a meeting time, an acceptance cutoff time indicative of a time offset before the meeting time, a first number of participants and is assigned, by a meeting organizer, to a first conference room having a capacity that is larger than the first number of participants;

data store interaction logic that interacts with a data store to store the meeting record in the data store;

trigger detection logic configured to detect occurrence of the acceptance cutoff time and generate a trigger signal, wherein the meeting record accessing logic is configured to, in response to the trigger signal, access the meeting record corresponding to the first meeting to identify a number of participants that have indicated a meeting acceptance and determine whether the number of participants that have indicated a meeting acceptance is smaller than the number of participants.

capacity filtering logic configured to, when the number of participants that have indicated a meeting acceptance is smaller than the number of participants, filter a set of conference room records based on the number of participants that have indicated a meeting acceptance to identify whether a second conference room having sufficient capacity to accommodate the number of participants that have indicated a meeting acceptance is available; and assignment logic configured to control the data store interaction logic to automatically modify the meeting record for the first meeting by assigning the first meeting to the second conference room if the second conference is available.

Example 19 is the computing system of any or all previous examples and further comprising:

electronic mail (email) system interaction logic configured to control an email system to send a re-assignment message to participants in the first meeting indicating that the first meeting is now assigned to the second conference room.

Example 20 is the computing system of any or all previous examples and further comprising:

meeting request generator logic that receives a meeting request input identifying a meeting request for a second meeting having a second number of participants, that is larger than the first number of participants for the first meeting, and that is within the capacity of the first conference room, wherein the capacity filtering logic, if the first meeting is still assigned to the first conference room, and in response to receiving the meeting request input, filters the set of conference room records based on the first number of participants to identify a different conference room having sufficient capacity to accommodate the first meeting, and wherein the assignment logic is configured to control the data store interaction logic to modify the meeting record for the first meeting by automatically assigning the different conference room to the first meeting, the assignment logic being further configured to assign the first conference room to the second meeting.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

at least one processor; and memory storing instructions executable by the at least one processor, wherein the instructions, when executed, cause the computing system to:

generate an electronic meeting record corresponding to a first meeting, the electronic meeting record including:

a participant attribute that identifies a first number of participants, and a conference room attribute that identities a first conference room assigned to the first meeting;

identify a capacity of the first conference room based on a first electronic conference room record of a plurality of electronic conference room records, each electronic conference room record representing a corresponding conference room and including a capacity attribute that identifies a capacity of the corresponding conference room;

determine that the capacity of the first conference room is larger than the first number of participants;

generate a control instruction that instructs a data store to store the electronic meeting record in the data store;

receive a meeting request input identifying a meeting request for a second meeting, the meeting request identifying a second number of participants;

detect, by a conflict detector, a meeting assignment conflict between the first and second meetings; and based on detection of the meeting assignment conflict, activate automatic assignment logic configured to:
  determine that the second number of participants is larger than the first number of participants for the first meeting, and within the capacity of the first conference room,
  filter the plurality of electronic conference room records based on the first number of participants to identify a second conference room having sufficient capacity to accommodate the first meeting,
  automatically modify the conference room attribute of the electronic meeting record corresponding to the first meeting to assign the second conference room to the first meeting, and
  automatically assign the first conference room to the second meeting.

2. The computing system of claim 1 wherein the instructions cause the computing system to:
  automatically assign the second conference room to the first meeting and the first conference room to the second meeting.

3. The computing system of claim 1 wherein the instructions cause the computing system to:
  configure a trigger detector to detect a trigger criterion;
  receive a trigger signal from the trigger detector that indicates occurrence of the trigger criterion; and
  in response to the trigger signal,
    access the electronic meeting record corresponding to the first meeting to identify a number of accepted participants that have indicated a meeting acceptance,
    determine that the number of accepted participants is smaller than the first number of participants, and
    filter the plurality of electronic conference room records based on the number of accepted participants that have indicated a meeting acceptance to identify that a different conference room having sufficient capacity to accommodate the number of accepted participants is available.

4. The computing system of claim 3 wherein the instructions cause the computing system to:
  trigger detector comprises a meeting record change detector configured to detect a change to the meeting request that affects the number of participants in the meeting and the trigger signal represents the change to the meeting request.

5. The computing system of claim 1, wherein the instructions cause the computing system to:
  control an email system to send a re-assignment message to participants in the first meeting indicating that the first meeting is now assigned to the second conference room.

6. The computing system of claim 3 wherein
  the electronic meeting record includes a meeting time attribute that identifies a meeting time corresponding to the first meeting,
  the trigger detector comprises a time trigger detector, and
  the instructions cause the computing system to:
    identify an acceptance cutoff time indicative of a time offset before the meeting time,
    configure the time trigger detector to detect occurrence of the acceptance cutoff time,
    receive a time trigger signal from the time trigger detector indicative of occurrence of the acceptance cutoff time, and
    in response to the time trigger signal,
      access the electronic meeting record corresponding to the first meeting to identify the number of accepted participants, and
      determine whether the number of accepted participants is smaller than the first number of participants.

7. The computing system of claim 1 wherein the instructions cause the computing system to:
  generate an indication of a user assignment interface with a suggested assignment portion suggesting assignment of the first conference room to the second meeting and an assignment user input mechanism.

8. The computing system of claim 7 wherein the instructions cause the computing system to:
  detect user actuation of the assignment user input mechanism; and
  in response to user actuation of the assignment user input mechanism, automatically assign the first conference room to the second meeting and the second conference room to the first meeting.

9. A computer implemented method, comprising:
  generating an electronic meeting record, based on user input to meeting record generator logic, corresponding to a first meeting, the electronic meeting record including:
    a participant attribute that identifies a first number of participants, and
    a conference room attribute that identifies a first conference room assigned to the first meeting;
  identifying a capacity of the first conference room based on a first electronic conference room record of a plurality of electronic conference room records, each electronic conference room record representing a corresponding conference room and including a capacity attribute that identifies a capacity of the corresponding conference room;
  determining that the capacity of the first conference room is larger than the first number of participants;
  controlling data store interaction logic to store the electronic meeting record in a data store;
  receiving a meeting request input identifying a meeting request for a second meeting, the meeting request identifying a second number of participants;
  detecting, by a conflict detector, a meeting assignment conflict between the first and second meetings; and
  based on detection of the meeting assignment conflict, activating automatic assignment logic that:
    determines that the second number of participants is larger than the first number of participants for the first meeting, and within the capacity of the first conference room,
    filters the plurality of electronic conference room records based on the first number of participants to identify a second conference room having sufficient capacity to accommodate the first number of participants for the first meeting;
    automatically modifies the conference room attribute of the electronic meeting record corresponding to the first meeting to assign the second conference room to the first meeting, and
    automatically assigns the first conference room to the second meeting.

10. The computer implemented method of claim 9 wherein assigning the second conference room comprises:
  automatically assigning the second conference room to the first meeting and wherein assigning the first conference room comprises automatically assigning the first conference room to the second meeting.

11. The computer implemented method of claim 9, and further comprising:
configuring a trigger detector to detect a trigger criterion;
receiving a trigger signal from the trigger detector that indicates occurrence of the trigger criterion;
in response to the trigger signal,
accessing the electronic meeting record corresponding to the first meeting to identify a number of accepted participants that have indicated a meeting acceptance,
determining that the number of accepted participants is smaller than the first number of participants, and
filtering the plurality of electronic conference room records based on the number of accepted participants that have indicated a meeting acceptance to identify that a different conference room having sufficient capacity to accommodate the number of accented participants is available.

12. The computer implemented method of claim 11, and further comprising:
trigger detector comprises a meeting record change detector configured to detect a change to the meeting request that affects the number of participants in the meeting and the trigger signal represents the change to the meeting request.

13. The computer implemented method of claim 9 and further comprising:
controlling an electronic mail (email) system to send a re-assignment message to participants in the first meeting indicating that the first meeting is now assigned to the second conference room.

14. The computer implemented method of claim 11, wherein
the electronic meeting record includes a meeting time attribute that identifies a meeting time corresponding to the first meeting and
the trigger detector comprises a time trigger detector, and further comprising:
identifying an acceptance cutoff time indicative of a time offset before the meeting time,
configuring the time trigger detector to detect occurrence of the acceptance cutoff time, and
receiving a time trigger signal from the time trigger detector indicative of occurrence of the acceptance cutoff time.

15. The computer implemented method of claim 14 and further comprising:
in response to the trigger signal,
accessing the electronic meeting record corresponding to the first meeting to identify the number of accepted participants; and
determining whether the number of accepted participants is smaller than the first number of participants.

16. The computer implemented method of claim 9 and further comprising:
generating an indication of a user assignment interface with a suggested assignment portion suggesting assignment of the first conference room to the second meeting and an assignment user input mechanism.

17. The computer implemented method of claim 16 and further comprising:
detecting user actuation of the assignment user input mechanism; and
in response to user actuation of the assignment user input mechanism, automatically assigning the first conference room to the second meeting and the second conference room to the first meeting.

18. A computing system, comprising:
at least one processor; and
memory storing instructions executable by the at least one processor, wherein the instructions, when executed, provide:
a meeting record processing system that generates a meeting record corresponding to a first meeting that has a meeting time, an acceptance cutoff time indicative of a time offset before the meeting time, a first number of participants and is assigned, by a meeting organizer, to a first conference room having a capacity that is larger than the first number of participants;
data store interaction logic that interacts with a data store to store the meeting record in the data store;
trigger detection logic configured to detect occurrence of the acceptance cutoff time and generate a trigger signal, wherein the meeting record accessing logic is configured to, in response to the trigger signal, access the meeting record corresponding to the first meeting to identify a number of participants that have indicated a meeting acceptance and determine whether the number of participants that have indicated a meeting acceptance is smaller than the number of participants;
capacity filtering logic configured to, when the number of participants that have indicated a meeting acceptance is smaller than the number of participants, filter a set of conference room records based on the number of participants that have indicated a meeting acceptance to identify whether a second conference room having sufficient capacity to accommodate the number of participants that have indicated a meeting acceptance is available; and
assignment logic configured to control the data store interaction logic to automatically modify the meeting record for the first meeting by assigning the first meeting to the second conference room if the second conference is available.

19. The computing system of claim 18 wherein the instructions, when executed, provide:
electronic mail (email) system interaction logic configured to control an email system to send a re-assignment message to participants in the first meeting indicating that the first meeting is now assigned to the second conference room.

20. The computing system of claim 18 wherein the instructions, when executed, provide:
meeting request generator logic that receives a meeting request input identifying a meeting request for a second meeting having a second number of participants, that is larger than the first number of participants for the first meeting, and that is within the capacity of the first conference room, wherein the capacity filtering logic, if the first meeting is still assigned to the first conference room, and in response to receiving the meeting request input, filters the set of conference room records based on the first number of participants to identify a different conference room having sufficient capacity to accommodate the first meeting, and wherein the assignment logic is configured to control the data store interaction logic to modify the meeting record for the first meeting by automatically assigning the different conference room to the first meeting, the assignment logic being further configured to assign the first conference room to the second meeting.

\* \* \* \* \*